(12) United States Patent
Honjo et al.

(10) Patent No.: US 10,789,523 B2
(45) Date of Patent: Sep. 29, 2020

(54) PROGRAM, INFORMATION PROCESSING SYSTEM, INFORMATION PROCESSING METHOD, AND READER/WRITER APPARATUS

(71) Applicant: SONY CORPORATION, Tokyo (JP)

(72) Inventors: Akira Honjo, Tokyo (JP); Daisuke Shiigi, Kanagawa (JP); Kayoko Nagatani, Tokyo (JP); Tadafumi Oyama, Tokyo (JP); Takashi Abeno, Kanagawa (JP); Ryuzo Nakata, Tokyo (JP); Kouki Inoue, Tokyo (JP); Akio Yoshioka, Tokyo (JP); Maki Nakamichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 48 days.

(21) Appl. No.: 16/302,313

(22) PCT Filed: Apr. 21, 2017

(86) PCT No.: PCT/JP2017/016065
§ 371 (c)(1),
(2) Date: Nov. 16, 2018

(87) PCT Pub. No.: WO2017/208672
PCT Pub. Date: Dec. 7, 2017

(65) Prior Publication Data
US 2019/0294944 A1    Sep. 26, 2019

(30) Foreign Application Priority Data
May 31, 2016    (JP) .................................. 2016-108234

(51) Int. Cl.
G06K 19/07    (2006.01)
G06F 3/044    (2006.01)
(Continued)

(52) U.S. Cl.
CPC ........ *G06K 19/0723* (2013.01); *A63F 13/235* (2014.09); *G06F 3/044* (2013.01);
(Continued)

(58) Field of Classification Search
CPC .................................................. G06K 19/0723
(Continued)

(56) References Cited

U.S. PATENT DOCUMENTS

| 2008/0105751 A1* | 5/2008 | Landau ................... A63F 13/10 235/492 |
| 2011/0320949 A1* | 12/2011 | Ohki ..................... G06F 40/177 715/727 |
| 2015/0009116 A1* | 1/2015 | Mangold ................ G06F 3/017 345/156 |

OTHER PUBLICATIONS

May 9, 2019, European Search Report issued for related EP Application No. 17806232.9.

* cited by examiner

*Primary Examiner* — Allyson N Trail
(74) *Attorney, Agent, or Firm* — Paratus Law Group, PLLC

(57) ABSTRACT

There is provided a program to make it possible to check whether operation of the RFID tag is a desired operation assumed by a user. The program causes a computer to function as: a means for acquiring information regarding motion of an RFID tag that performs near-field wireless communication; a means for recognizing preliminary operation of the RFID tag on a basis of the information regarding the motion; and a means for performing processing of displaying the recognized preliminary operation of the RFID tag. This configuration makes it possible to check whether operation of the RFID tag is a desired operation assumed by a user.

11 Claims, 6 Drawing Sheets

(51) Int. Cl.
*G06F 3/0488* (2013.01)
*G06K 19/077* (2006.01)
*A63F 13/235* (2014.01)
*G06F 3/046* (2006.01)
*G06F 3/0481* (2013.01)

(52) U.S. Cl.
CPC ............ *G06F 3/046* (2013.01); *G06F 3/0481* (2013.01); *G06F 3/0488* (2013.01); *G06K 19/07701* (2013.01)

(58) Field of Classification Search
USPC .......................................................... 235/492
See application file for complete search history.

FIG. 5

| CARD TYPE | TARGET OPERATION | CARD OPERATION | PARAMETER | | | | |
|---|---|---|---|---|---|---|---|
| | | | CARD TYPE ID | MOVEMENT DIRECTION | MOVEMENT SPEED | MOVEMENT DISTANCE | ROTATION RADIUS |
| KITCHEN KNIFE | CUTTING | UP-DOWN | ○ | ○ | ○ | ○ | |
| PEELER | PEELING | UP-DOWN LEFT-RIGHT | ○ | ○ | ○ | ○ | |
| SPATULA FRYING PAN POT | MIXING | TURN | ○ | | ○ | | ○ |
| TURNER | TURNING OVER | UP-DOWN | ○ | ○ | ○ | ○ | |
| FRYING PAN | FRYING | UP-DOWN LEFT-RIGHT | ○ | ○ | ○ | ○ | |
| SEASONING FOOD MATERIAL | PUTTING IN | LEFT-RIGHT | ○ | ○ | ○ | ○ | |

FIG. 6

| OPERATION | CARD TYPE | FIRST DETERMINATION CONDITION | FIRST DETECTION DISPLAY | SECOND DETERMINATION CONDITION | DISPLAY AT AND AFTER SECOND TIME | OPERATION COMPLETION DISPLAY |
|---|---|---|---|---|---|---|
| CUTTING | KITCHEN KNIFE | GOING-AND-RETURNING (PLURALITY OF TIMES) OPERATION IN UP-DOWN DIRECTION | KITCHEN KNIFE ICON DISPLAY | GOING-AND-RETURNING (PLURALITY OF TIMES) OPERATION IN UP-DOWN DIRECTION IN ICON DISPLAY STATE | FOOD MATERIAL OF CARD TYPE DETECTED AT SAME TIME IS CUT FOR EACH DETECTION | CUTTING OF FOOD MATERIAL IS COMPLETED BY BEING REPEATED DESIGNATED NUMBER OF TIMES |
| PEELING | PEELER | GOING-AND-RETURNING (PLURALITY OF TIMES) OPERATION IN ANY DIRECTION | PEELER ICON DISPLAY | GOING-AND-RETURNING (PLURALITY OF TIMES) OPERATION IN ANY DIRECTION IN ICON DISPLAY STATE | FOOD MATERIAL OF CARD TYPE DETECTED AT SAME TIME IS PEELED FOR EACH DETECTION | PEELING OF FOOD MATERIAL IS COMPLETED BY BEING REPEATED DESIGNATED NUMBER OF TIMES |
| MIXING | SPATULA | ROTATION (PLURALITY OF TIMES) OPERATION | ROTATION ARROW ICON DISPLAY | ROTATION (PLURALITY OF TIMES) OPERATION IN ICON DISPLAY STATE | FOOD MATERIALS IN COOKING TOOL OF CARD TYPE DETECTED AT SAME TIME ARE MIXED | COOKING OF FOOD MATERIALS IN COOKING TOOL IS COMPLETED BY BEING REPEATED DESIGNATED NUMBER OF TIMES |
| | FRYING PAN POT | ROTATION (PLURALITY OF TIMES) OPERATION | ROTATION ARROW ICON DISPLAY | ROTATION (PLURALITY OF TIMES) OPERATION IN ICON DISPLAY STATE | FOOD MATERIALS INSIDE ARE MIXED | COOKING OF FOOD MATERIALS IS COMPLETED BY BEING REPEATED DESIGNATED NUMBER OF TIMES |

US 10,789,523 B2

PROGRAM, INFORMATION PROCESSING SYSTEM, INFORMATION PROCESSING METHOD, AND READER/WRITER APPARATUS

CROSS REFERENCE TO PRIOR APPLICATION

This application is a National Stage Patent Application of PCT International Patent Application No. PCT/JP2017/016065 (filed on Apr. 21, 2017) under 35 U.S.C. § 371, which claims priority to Japanese Patent Application No. 2016-108234 (filed on May 31, 2016), which are all hereby incorporated by reference in their entirety.

TECHNICAL FIELD

The present disclosure relates to a program, an information processing system, an information processing method, and a reader/writer apparatus.

BACKGROUND ART

Conventionally, as described in Patent Literature 1 below, for example, there has been known the following technology: in a reader of an RFID tag for near-field wireless communication, a plurality of antennas for transmitting and receiving data are arranged to spread within a predetermined range, and one antenna to be used for transmitting and receiving data is selected from among the plurality of antennas.

CITATION LIST

Patent Literature

Patent Literature 1: WO 2014/136167

DISCLOSURE OF INVENTION

Technical Problem

According to the technology described in Patent Literature 1, a position of the RFID tag can be detected by specifying one antenna to be used for transmitting and receiving data from among the plurality of antennas. However, the method of providing the plurality of antennas faces difficulty in detecting the position of the RFID tag with high precision.

In addition, in the case of trying to recognize a predetermined motion on the basis of the position of the RFID tag, if motion is recognized as a motion different from an assumed motion, it is difficult to perform desired operation on the basis of the motion of the RFID tag. For example, in the case of detecting motion of the RFID tag on the reader/writer side and trying to play a card game on the basis of the motion of the RFID tag, if motion is recognized as a motion different from a motion assumed by a user, it is difficult to play the card game.

Hence, making it possible to check whether operation of the RFID tag is a desired operation assumed by a user has been required.

Solution to Problem

According to the present disclosure, there is provided a program causing a computer to function as: a means for acquiring information regarding motion of an RFID tag that performs near-field wireless communication: a means for recognizing preliminary operation of the RFID tag on a basis of the information regarding the motion; and a means for performing processing of displaying the recognized preliminary operation of the RFID tag.

In addition, according to the present disclosure, there is provided an information processing system including: a reader/writer pad including a position information acquisition unit configured to acquire position information of an RFID tag that performs near-field wireless communication: and an information processing apparatus including a preliminary operation recognition unit configured to recognize preliminary operation of the RFID tag on a basis of the position information, a display processing unit configured to perform processing of displaying the recognized preliminary operation of the RFID tag, and a decision processing unit configured to decide the preliminary operation as main operation in a case where the preliminary operation continues to be recognized while the preliminary operation is being displayed.

In addition, according to the present disclosure, there is provided an information processing method including: acquiring information regarding motion of an RFID tag that performs near-field wireless communication; recognizing preliminary operation of the RFID tag on a basis of the information regarding the motion; and performing processing of displaying the recognized preliminary operation of the RFID tag.

In addition, according to the present disclosure, there is provided a reader/writer apparatus including: a position information acquisition unit configured to acquire position information of an RFID tag that performs near-field wireless communication; and a transmission unit configured to transmit the position information to an information processing apparatus in order for the information processing apparatus to perform processing of recognizing preliminary operation of the RFID tag on a basis of the position information, processing of displaying the recognized preliminary operation of the RFID tag, and processing of deciding the preliminary operation as main operation in a case where the preliminary operation continues to be recognized while the preliminary operation is being displayed.

Advantageous Effects of Invention

According to the present disclosure as described above, it is possible to check whether operation of the RFID tag is a desired operation assumed by a user.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a schematic diagram illustrating operation variations and parameters acquired on the information processing apparatus side.

FIG. 6 is a schematic diagram illustrating operation decision by repeated operation for each of operations of "cutting", "peeling", and "mixing".

MODE(S) FOR CARRYING OUT THE INVENTION

Figure 1:
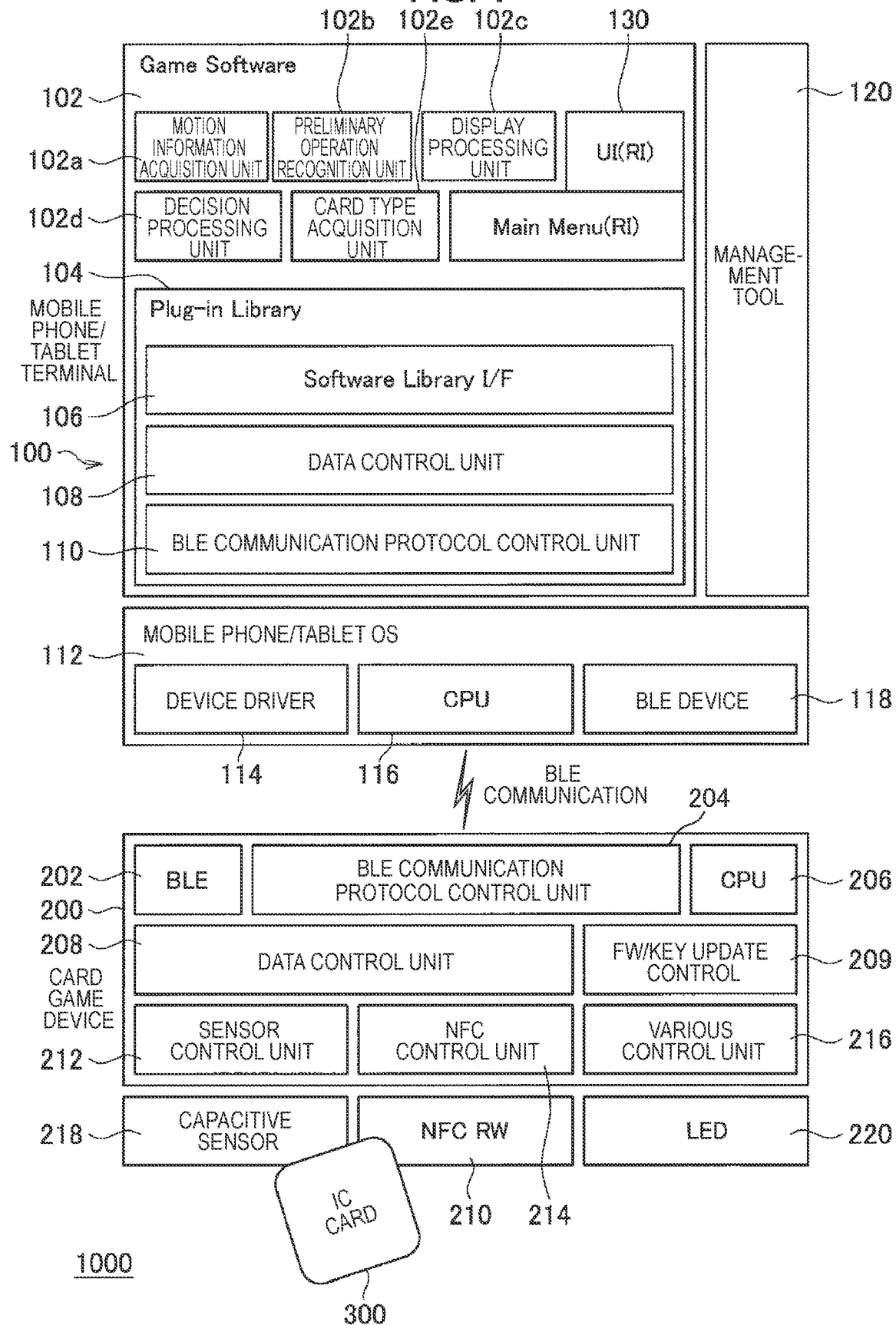
FIG. 1 is a schematic diagram illustrating a configuration of a system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be given in the following order.
1. System configuration example
2. Display state of display unit in response to card manipulation
3. Sequence of processing of present embodiment
4. Examples of operation variations
1. System Configuration Example First, a schematic configuration of a system 1000 according to an embodiment of the present disclosure is described with reference to FIG. 1. FIG. 1 is a schematic diagram illustrating a configuration of the system 1000 according to an embodiment of the present disclosure. As illustrated in FIG. 1, the system 1000 includes an information processing apparatus 100, a reader/writer pad (card game device) 200, and an IC card 300. The information processing apparatus 100 is, for example, an apparatus such as a mobile phone (smartphone) or a tablet terminal. The reader/writer pad 200 is, for example, a device for performing a card game, is configured to have a flat plate shape, for example, and includes a plurality of reader/writers (hereinafter referred to as R/Ws) 210 arranged in a planar arrangement.

The reader/writer pad 200 generates carrier waves in accordance with a communication standard of near field communication (NFC), and communicates with the card 300. Therefore, the R/W 210 and the card 300 transmit and receive carrier waves with a frequency (13.56 MHz) conforming to the communication standard of NFC, by using electromagnetic induction. On the other hand, the reader/writer pad 200 and the card 300 may communicate in accordance with another communication standard different from NFC.

As described above, each of the plurality of R/Ws 210 that communicate with the card 300 can generate carrier waves in accordance with the communication standard of NFC to communicate with the card 300. The plurality of R/Ws 210 are arranged in a matrix, and coordinates in a region of a R/W pad 210 are determined. Therefore, the reader/writer pad 200 can detect a position (coordinate values) of the card 300 on the basis of positions of individual R/Ws 210 that communicate with the card 300, and the R/W 210 functions as a position information acquisition unit.

The information processing apparatus 100 and the reader/writer pad 200 are configured to be able to communicate by a communication scheme or the like of Bluetooth (registered trademark), for example. In addition, manipulation information from a manipulation button or the like included in the reader/writer pad 200 is sent to the information processing apparatus 100.

As illustrated in FIG. 1, the information processing apparatus 100 includes game software 102, a plug-in library 104, a software library interface 106, a data control unit 108, a BLE communication protocol control unit 110, an operation system 112, a device driver 114, a CPU 116, a BLE device 118, and a management tool 120.

The game software 102 is software that a user plays by connecting the reader/writer pad 200. The game software 102 and the plug-in library 104 are a library that the game software 102 includes and uses in order to control the reader/writer pad 200. It is created by a creator who creates a game, a company of software, or the like, and is incorporated into the information processing apparatus 100 by installation or the like. On the other hand, the plug-in library 104 is a common library prepared on the manufacturer side of the information processing apparatus 100, and provides information with commonality to the game software 102. Specifically, in the present embodiment, information indicating a card type and information (position information, speed information, information regarding a movement direction or a movement distance, or the like) indicating motion of a card are sent from the plug-in library 104 to the game software 102. On the game software 102 side, a game can be freely constructed on the basis of such information. The software library interface 106 is an interface used when the game software 102 accesses the plug-in library 104. The data control unit 108 extracts card operation from data (coordinate values or a card type) acquired from the reader/writer pad 200. The data control unit 108 acquires specific information such as a movement speed, a movement direction, a movement distance, or a rotation radius from coordinate information of the card 300. The Bluetooth (registered trademark) (BLE) communication protocol control unit 110 performs protocol control for BLE communication with the reader/writer pad 200. The management tool 120 controls a communication process with an external server, such as firmware update of the reader/writer pad 200.

The operation system 112 corresponds to an operation system included in a mobile phone or a table terminal. The device driver 114, the BLE device 118, and the CPU 116 are hardware included in the information processing apparatus 100. Note that the structural elements illustrated in FIG. 1 can be configured using the CPU 116 (central processing unit) and a program (software) for causing it to function. In this case, the program can be stored in a recording medium such as a memory included in the information processing apparatus 100.

In addition, the information processing apparatus 100 includes a user interface (UI) 130. The user interface includes a display unit such as a liquid crystal display panel and a touch sensor to which user manipulation is input.

The game software 102 causes the CPU 116 to function, thereby functioning as a position information acquisition unit 102a, a preliminary operation recognition unit 102b, a display processing unit 102c, a decision processing unit 102d, and a card type acquisition unit 102e. A motion information acquisition unit 102a acquires information regarding motion of the card 300 from the plug-in library 104. Note that information regarding motion of the card 300 is acquired by the data control unit 108 of the plug-in library 104 and sent to the game software 102: the data control unit 108 acquires not only coordinate information of the card 300 acquired from the reader/writer pad 200, but also more specific information, such as whether the motion is in a vertical direction or a horizontal direction, a motion along a straight line, a motion along an arc, a motion in a direction going away from the surface of the reader/writer pad 200, or a motion in a direction approaching the surface, and provides the information to the game software as necessary. The plug-in library 104 provides motion information of the card 300, such as position information, to the game software 102 in response to a request from the game software 102. The preliminary operation recognition unit 102b recognizes preliminary operation of the card 300 on the basis of the motion information. The display processing unit 102c performs processing of displaying the recognized preliminary operation (operation icon) and main operation of the card 300. In the case where the preliminary operation continues to be recognized while the preliminary operation is being displayed, the decision processing unit 102d decides the preliminary operation as main operation. The card type acquisition unit 102e acquires a card type on the basis of a card type ID obtained from the card 300.

In addition, as illustrated in FIG. 1, the reader/writer pad 200 includes a BLE device 202, a BLE communication protocol control unit 204, a CPU 206, a data control unit 208, a FW/key update control unit 209, a sensor control unit 212, an NFC control unit 214, a various control unit 216, and the R/W 210. The reader/writer pad 200 further includes a capacitive sensor 218 that detects capacitance to detect a position of the card 300, and an LED 220 for performing display.

The BLE device 202 communicates with the BLE device 118 by Bluetooth (registered trademark). The BLE communication protocol control unit 204 performs protocol control for BLE communication. The data control unit 208 performs card read/write control and sensor data control. The FW/key update control unit 209 controls update of firmware (FW) and a card access key. The sensor control unit 212 controls the capacitive sensor 218. The NFC control unit 214 controls an NFC reader/writer (R/W 210). The various control unit 216 performs various device control of the card game device.

In the above configuration, when the user moves the card 300 on the reader/writer pad 200, display on the display unit of the user interface 130 of the information processing apparatus 100 is performed depending on how the card 300 is moved. As an example, the card 300 is manipulated on the reader/writer pad 200 by a child. The information processing apparatus 100 displays various applications for children, such as a cooking game, a battle-type game, or playing house, in response to manipulation of the card 300.

2. Display State of Display Unit in Response to Card Manipulation

Figure 2:
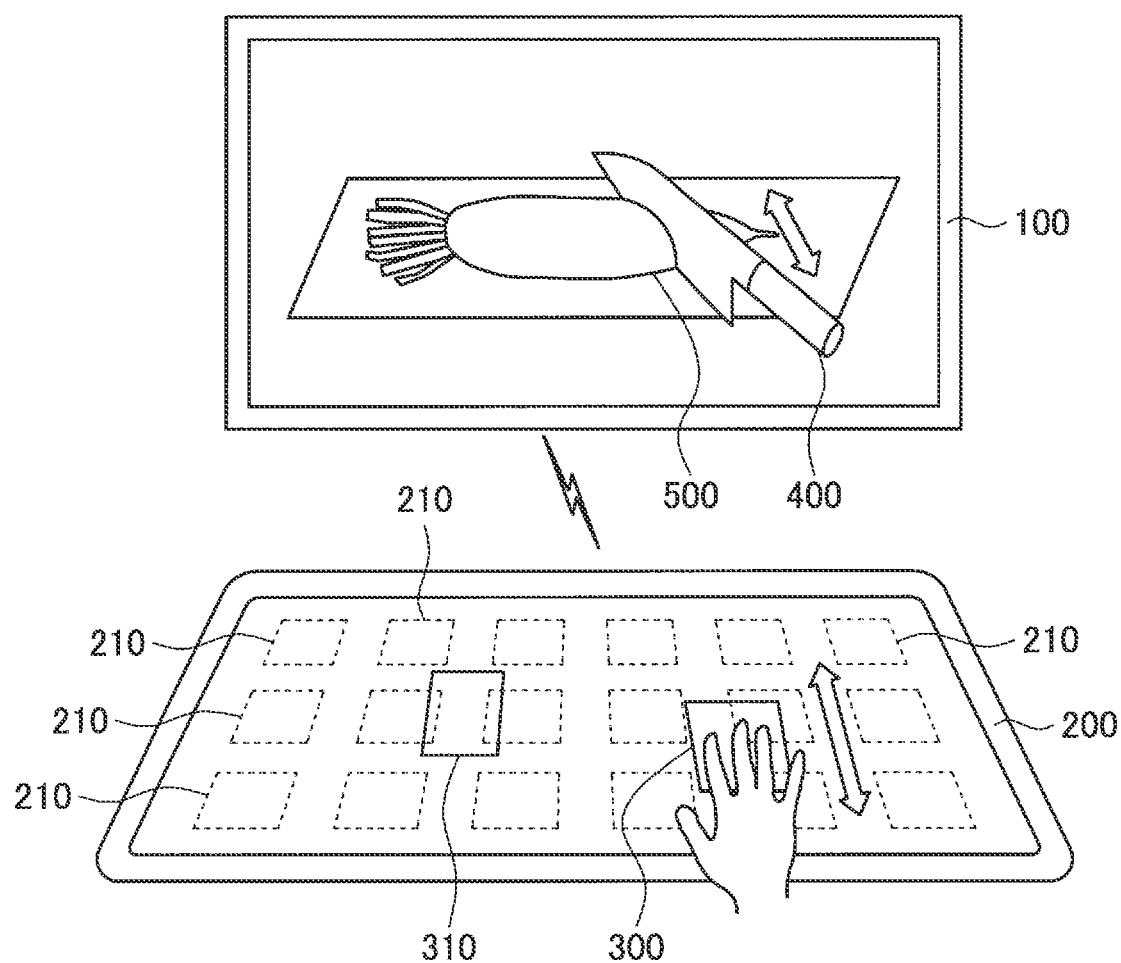
FIG. 2 is a schematic diagram illustrating a display state of a display unit in response to card manipulation by a user.

FIG. 2 illustrates a display state of the display unit in response to card manipulation by the user. The example illustrated in FIG. 2 illustrates how a child plays with a cooking game. More specifically, in FIG. 2, the child moves the card 300 in a front-back (up-down) direction: thus, motion of the card 300 is reflected in motion of a kitchen knife 400 displayed on the display unit, and operation of cutting a vegetable 500 with the kitchen knife 400 is displayed on the display unit in response to motion of the card 300. Thus, the child, who is the user, can achieve operation, in a display screen, of cutting the vegetable 500 with the kitchen knife 400 by moving the card 300 front and back (up and down).

As illustrated in FIG. 2, the plurality of R/Ws 210 are arranged spatially in a plane of an upper surface of the reader/writer pad 200. Therefore, the R/W 210 can detect a position and motion of the card 300 on the basis of a reception signal. In addition, the R/W 210 can detect motion of the card 300 in directions approaching and going away from the reader/writer pad 200 on the basis of a reception signal. Furthermore, the capacitive sensor 218 is arranged spatially in the plane of the upper surface of the reader/writer pad 200, and the capacitive sensor 218 can detect planar motion of the card 300 along the upper surface of the reader/writer pad 200 and motion of the card 300 in directions approaching and going away from the reader/writer pad 200. As a specific embodiment, the following method is given: detection of a position and motion of the reader/writer pad 200 is performed by the capacitive sensor 218, and information peculiar to a card, such as a card type, is received by the R/W 210. As a matter of course, position and motion detection can be performed on the basis of a reception signal of the R/W 210, and the R/W 210 and the capacitive sensor 218 may be used in combination to perform position and motion detection.

Figure 3:
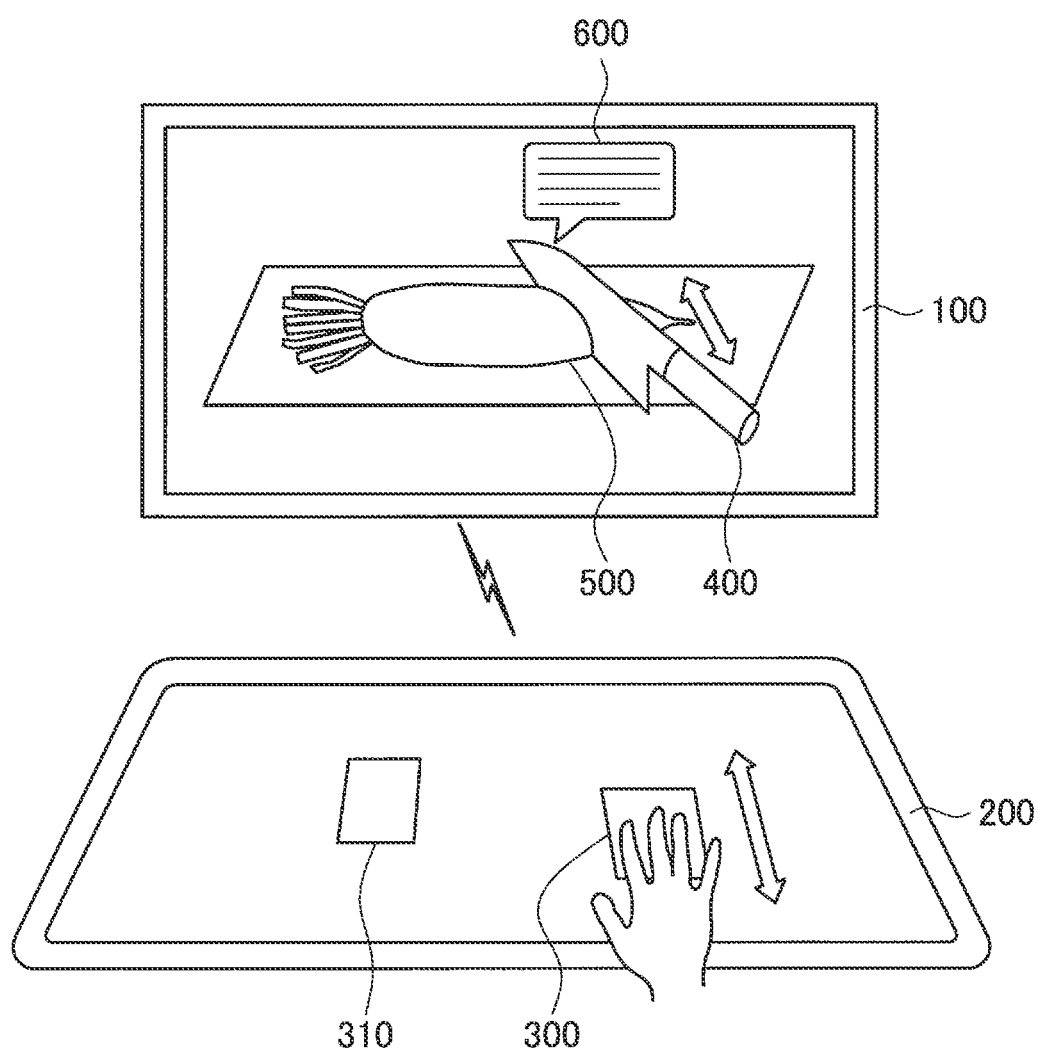
FIG. 3 is a schematic diagram illustrating a state where an operation icon indicating that motion of a card corresponds to motion of a kitchen knife is displayed.

To achieve the operation illustrated in FIG. 2, when the child moves the card 300 in the front-back (up-down) direction, first, display (operation icon 60X)) indicating that the motion corresponds to motion of the kitchen knife 400 is displayed, as illustrated in FIG. 3. Thus, the child can recognize that the motion of the card 300 in the front-back (up-down) direction corresponds to the motion of the kitchen knife 400. Note that user operation in a state where the operation icon 600 is being displayed will be referred to as preliminary operation. The child who sees the display in FIG. 3 repeatedly performs the motion of the card 300 in the front-back direction in the case of wanting to decide the motion of the card 300 in the front-back direction as the motion of the kitchen knife 400. Thus, it is decided that the motion of the card 300 in the front-back direction corresponds to the motion of the kitchen knife 400. After the decision, the operation icon 600 is not displayed.

Thus, on premises that the motion of the card 300 corresponds to the motion of the kitchen knife 400, the vegetable 500 can be cut at a desired position by giving a desired motion to the card 300, and the vegetable 500 can be cut into a desired shape.

Note that in regard to the vegetable 500, a card 310 corresponding to the vegetable 500 is placed on the reader/writer pad 200; thus, a type ID of the card 310 is read by the R/W 210, and the vegetable 500 corresponding to the type ID is displayed on the display unit of the information processing apparatus 100.

In this manner, in the present embodiment, the operation icon 600 that associates motion of the card 300 with motion of an object (the kitchen knife 400) in the display unit is displayed. Thus, the user can recognize what kind of motion of an object in the display unit the motion of the card 300 corresponds to. Then, in a state where the operation icon 600 is displayed, the same motion of the card 300 continues to be repeatedly performed; thus, input operation by the motion of the card 300 is decided, and the motion of the card 300 corresponds to the motion of the kitchen knife 400. Thus, a desired motion can be given to an object in the display unit by optimally manipulating the card 300. Note that FIGS. 2 to 3 illustrate an example of a cooking game, but the same applies to other applications.

In FIG. 3, as the operation icon 600, the operation icon 600 indicating that the motion of the card 300 corresponds to the motion of the kitchen knife 400 is displayed separately from the kitchen knife 400: however, it is also possible to cause display of the kitchen knife 400 itself to have a function of an operation icon 400. In this case, the operation icon 600 can be displayed by using the kitchen knife 400 itself by a technique such as displaying the kitchen knife 400 with a broken line before operation decision and displaying the kitchen knife 400 with a solid line after operation decision, or changing a line type, a shade, or the like of display between before operation decision and after operation decision. In either case, a difference is caused between display be preliminary operation before decision and display of main operation after decision, so that preliminary operation and main operation after decision can be distinguished from each other.

3. Sequence of Processing of Present Embodiment

Figure 4:
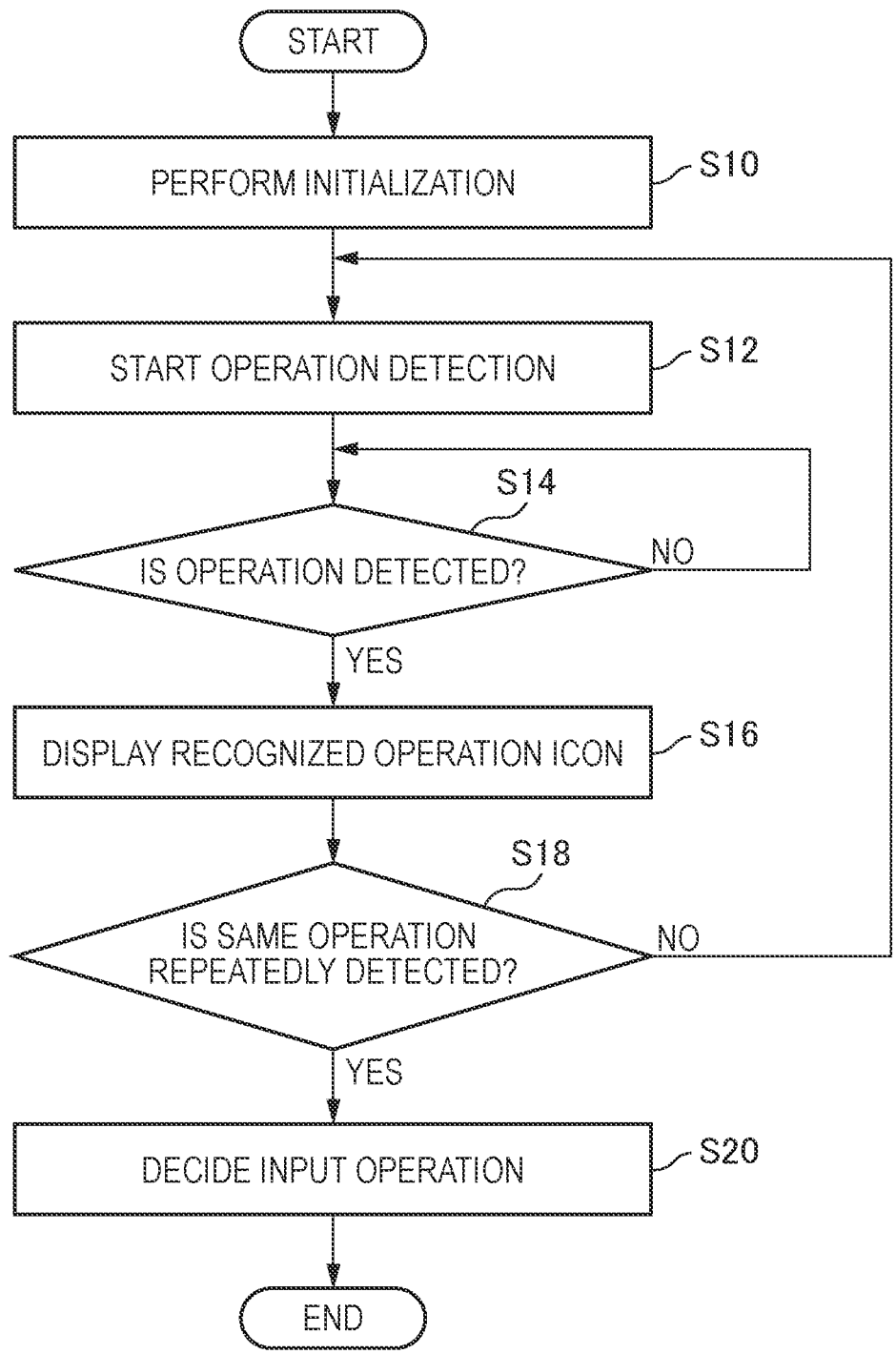
FIG. 4 is a flowchart illustrating an overview of processing of the present embodiment.

FIG. 4 is a flowchart illustrating an overview of processing of the present embodiment. First, in step S10, initialization is performed. In next step S12, operation detection is started. Thus, the reader/writer pad 200 starts detection of motion of the card 300. Here, the game software 102 calls the software library interface 106 in order to detect operation (first time) of the card 300 Then, the data control unit 108 starts collecting card information needed for action detection. Then, by BLE communication between the BLE communication protocol control unit 110 and the BLE communication protocol control unit 204, a type of the card 300 and coordinate values of the card 300 are acquired a necessary number of times.

In next step S14, it is determined whether or not operation of the card 300 is detected, and in the case where operation of the card 300 is detected, the processing goes to next step S16. On the other hand, in the case where operation of the card 300 is not detected, the processing waits at step S14. In step S16, on the basis of detection of the operation of the card 300, the recognized operation icon 600 is displayed. Here, the plug-in library 104 sends back action detection to the game software 102. Then, the first action detection is displayed as the operation icon 600 on the display screen of the information processing apparatus 100.

In next step S18, it is determined whether or not the same operation is repeatedly detected in a state where the operation icon 600 is displayed, and in the case where the same operation is repeatedly detected, the processing goes to step S20. Here, the game software 102 calls action detection (second time) of the software library interface 106. Then, the second action detection is sent back from the plug-in library 104 to the game software 102.

In step S20, input operation is decided. Thus, the game software 102 decides action detection, and reflects performance of an action in a game. On the other hand, in the case where the same operation is not repeatedly detected in step S20, the processing returns to step S12.

4. Examples of Operation Variations

FIG. 5 is a schematic diagram illustrating operation variations and parameters acquired on the information processing apparatus 100 side. As illustrated in FIG. 5, a tool used in a cooking game differs depending on a card type, and target operation, card operation, and parameters (card type ID, movement direction, movement speed, movement distance, rotation radius) are determined in accordance with the tool. In an example of the kitchen knife 400, the target operation is cutting operation, the card operation is in an up-down direction (or front-back direction), and a card type ID, a movement direction, a movement speed, and a movement distance are acquired as parameters.

FIG. 6 is a schematic diagram illustrating operation decision by repeated operation for each of operations of "cutting", "peeling", and "mixing". For the operation of "cutting", a motion corresponding to the kitchen knife 400 is detected on the basis of a card type, and in the first determination condition (step S14 in FIG. 4), it is determined whether or not there is going-and-returning operation (a plurality of times) in the up-down direction (or front-back direction). Specifically, in step S14 in FIG. 4, a type ID indicating a card type is acquired by the information processing apparatus 100, and detection of operation based on corresponding parameters is performed on the basis of the type ID. In the example of the kitchen knife 400, in the case where parameters of a movement direction, a movement speed, and a movement distance satisfy predetermined conditions, the operation icon 600 is displayed. Similarly, also for other card types, the operation icon 600 is displayed when parameters corresponding to the card type satisfy predetermined conditions.

When operation is detected in the first determination condition, the operation icon 600 is displayed in step S16 in FIG. 4. Then, when going-and-returning operation (a plurality of times) in the up-down direction (or front-back direction) is detected in a state where the operation icon 600 is displayed in the second determination condition (step S18 in FIG. 4), the operation of cutting a food material with the kitchen knife 400 is decided in accordance with the motion of the card 300, and in and after the second determination condition, a food material (vegetable 500) corresponding to a card type of the card 310 detected at the same time is cut in accordance with the operation of the card. Then, cutting of the food material is completed by being repeated a designated number of times.

Note that the present embodiment shows an example in which the information processing apparatus 100 and the reader/writer pad 200 include different apparatuses, but the information processing apparatus 100 and the reader/writer pad 200 may be configured as an integrated apparatus.

As described above, according to the present embodiment, preliminary operation of the card 300 is recognized on the basis of motion information obtained on the basis of communication with an RFID tag by near-field wireless communication, and the recognized preliminary operation is displayed using the operation icon 600; thus, operation performed by a user can be matched with operation of an object in a game. Then, when the preliminary operation is continued in a state where the operation icon 600 is being displayed, the preliminary operation is decided as main operation; thus, operation performed by a user can be matched with operation of an object in a game, and then decided as main operation. Thus, the user can cause an object in a game to perform desired operation by manipulating the card 300.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A program causing a computer to function as:
  a means for acquiring information regarding motion of an RFID tag that performs near-field wireless communication;
  a means for recognizing preliminary operation of the RFID tag on a basis of the information regarding the motion; and a means for performing processing of displaying the recognized preliminary operation of the RFID tag.

(2)

The program according to claim 1, causing the computer to further function as a means for deciding the preliminary operation as main operation in a case where the preliminary operation continues to be recognized while the preliminary operation is being displayed.

(3)

The program according to claim 2, causing the computer to further function as a means for performing processing of displaying the main operation.

(4)

The program according to claim 3, in which the means for performing processing of displaying the preliminary operation clearly expresses that the preliminary operation is preliminary operation by performing display different from display of the main operation.

(5)

The program according to claim 4, in which the means for performing processing of displaying the preliminary operation clearly expresses that the preliminary operation is preliminary operation for the main operation by adding a predetermined icon to the display of the main operation.

(6)

The program according to claim 4, in which the means for performing processing of displaying the preliminary operation clearly expresses that the preliminary operation is preliminary operation by changing a line type, a shade, or a color of the display of the main operation.

(7)

The program according to claim 1, causing the computer to further function as a means for acquiring a type of the RFID tag,
in which, on a basis of a parameter of operation determined depending on the type of the RFID tag, the means for recognizing the preliminary operation recognizes the preliminary operation in a case where the parameter satisfies a predetermined condition.

(8)

The program according to (7), in which the information regarding the motion is detected from a capacitive sensor, and the type of the RFID tag is obtained on a basis of communication with the RFID tag by near-field wireless communication.

(9)

The program according to claim 2,
in which the RFID tag is a game card, and
each of the preliminary operation and the main operation is operation of an object in a game, the operation corresponding to motion of the game card.

(10)

An information processing system including:
a reader/writer pad including
a position information acquisition unit configured to acquire position information of an RFID tag that performs near-field wireless communication; and
an information processing apparatus including
a preliminary operation recognition unit configured to recognize preliminary operation of the RFID tag on a basis of the position information,
a display processing unit configured to perform processing of displaying the recognized preliminary operation of the RFID tag, and
a decision processing unit configured to decide the preliminary operation as main operation in a case where the preliminary operation continues to be recognized while the preliminary operation is being displayed.

(11)

An information processing method including:
acquiring information regarding motion of an RFID tag that performs near-field wireless communication:
recognizing preliminary operation of the RFID tag on a basis of the information regarding the motion; and
performing processing of displaying the recognized preliminary operation of the RFID tag.

(12)

A reader/writer apparatus including:
a position information acquisition unit configured to acquire position information of an RFID tag that performs near-field wireless communication; and
a transmission unit configured to transmit the position information to an information processing apparatus in order for the information processing apparatus to perform processing of recognizing preliminary operation of the RFID tag on a basis of the position information, processing of displaying the recognized preliminary operation of the RFID tag, and processing of deciding the preliminary operation as main operation in a case where the preliminary operation continues to be recognized while the preliminary operation is being displayed.

REFERENCE SIGNS LIST

100 information processing apparatus
102 game software
102a position information acquisition unit
102b preliminary operation recognition unit
102c display processing unit
102d decision processing unit
102e card type acquisition unit
200 reader/writer pad
300 card

The invention claimed is:

1. A non-transitory computer-readable medium having embodied thereon a program, which when executed by a computer causes the computer to execute a method, the method comprising:

acquiring information regarding motion of an RFID tag that performs near-field wireless communication;
recognizing preliminary operation of the RFID tag on a basis of the information regarding the motion;
performing processing of displaying the recognized preliminary operation of the RFID tag; and
acquiring a type of the RFID tag,
wherein, on a basis of a parameter of operation determined depending on the type of the RFID tag, the recognizing the preliminary operation recognizes the preliminary operation in a case where the parameter satisfies a predetermined condition.

2. The non-transitory computer-readable medium according to claim 1, wherein the executed method further comprises:

deciding the preliminary operation as main operation in a case where the preliminary operation continues to be recognized while the preliminary operation is being displayed.

3. The non-transitory computer-readable medium according to claim 2, wherein the executed method further comprises:
performing processing of displaying the main operation.

4. The non-transitory computer-readable medium according to claim 3, wherein the performing processing of displaying the preliminary operation clearly expresses that the preliminary operation is preliminary operation by performing display different from display of the main operation.

5. The non-transitory computer-readable medium according to claim 4, wherein the performing processing of displaying the preliminary operation clearly expresses that the preliminary operation is preliminary operation for the main operation by adding a predetermined icon to the display of the main operation.

6. The non-transitory computer-readable medium according to claim 4, wherein the performing processing of displaying the preliminary operation clearly expresses that the preliminary operation is preliminary operation by changing a line type, a shade, or a color of the display of the main operation.

7. The non-transitory computer-readable medium according to claim 2,
wherein the RFID tag is a game card, and
each of the preliminary operation and the main operation is operation of an object in a game, the operation corresponding to motion of the game card.

8. The non-transitory computer-readable medium according to claim 1, wherein the information regarding the motion is detected from a capacitive sensor, and the type of the RFID tag is obtained on a basis of communication with the RFID tag by near-field wireless communication.

9. An information processing system comprising:
a reader/writer pad including
a position information acquisition unit configured to acquire position information of an RFID tag that performs near-field wireless communication; and
an information processing apparatus including
a preliminary operation recognition unit configured to recognize preliminary operation of the RFID tag on a basis of the position information,
a display processing unit configured to perform processing of displaying the recognized preliminary operation of the RFID tag, and
a decision processing unit configured to decide the preliminary operation as main operation in a case where the preliminary operation continues to be recognized while the preliminary operation is being displayed,
wherein, on a basis of a parameter of operation determined depending on a type of the RFID tag, the preliminary operation recognition unit recognizes the preliminary operation in a case where the parameter satisfies a predetermined condition, and
wherein the position information acquisition unit, the preliminary operation recognition unit, the display processing unit, and the decision processing unit are each implemented via at least one processor.

10. An information processing method comprising:
acquiring information regarding motion of an RFID tag that performs near-field wireless communication;
recognizing preliminary operation of the RFID tag on a basis of the information regarding the motion;
performing processing of displaying the recognized preliminary operation of the RFID tag;
acquiring a type of the RFID tag; and
deciding the preliminary operation as main operation in a case where the preliminary operation continues to be recognized while the preliminary operation is being displayed,
wherein, on a basis of a parameter of operation determined depending on the type of the RFID tag, the recognizing the preliminary operation recognizes the preliminary operation in a case where the parameter satisfies a predetermined condition.

11. A reader/writer apparatus comprising:
a position information acquisition unit configured to acquire position information of an RFID tag that performs near-field wireless communication; and
a transmission unit configured to transmit the position information to an information processing apparatus in order for the information processing apparatus to perform processing of recognizing preliminary operation of the RFID tag on a basis of the position information, processing of displaying the recognized preliminary operation of the RFID tag, and processing of deciding the preliminary operation as main operation in a case where the preliminary operation continues to be recognized while the preliminary operation is being displayed,
wherein, on a basis of a parameter of operation determined depending on a type of the RFID tag, the information processing apparatus recognizes the preliminary operation in a case where the parameter satisfies a predetermined condition, and
wherein the position information acquisition unit and the transmission unit are each implemented via at least one processor.

* * * * *